United States Patent
Murata et al.

(10) Patent No.: US 8,122,987 B2
(45) Date of Patent: Feb. 28, 2012

(54) VEHICLE HAVING A WHEEL ASSEMBLY WITH AN IN-WHEEL MOTOR

(75) Inventors: Satoshi Murata, Nishikamo-gun (JP); Michitaka Tsuchida, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 465 days.

(21) Appl. No.: 12/376,976

(22) PCT Filed: Aug. 10, 2007

(86) PCT No.: PCT/IB2007/002312
§ 371 (c)(1), (2), (4) Date: Feb. 10, 2009

(87) PCT Pub. No.: WO2008/017947
PCT Pub. Date: Feb. 14, 2008

(65) Prior Publication Data
US 2010/0163319 A1    Jul. 1, 2010

(30) Foreign Application Priority Data
Aug. 11, 2006   (JP) .................................. 2006-219763

(51) Int. Cl.
*B60K 7/00* (2006.01)

(52) U.S. Cl. ..................... 180/65.51; 180/65.6; 903/909; 310/67 R (58) Field of Classification Search ............. 180/55, 180/65.51, 65.6, 65.7; 903/909, 910, 951; 310/67 A, 67 R, 80, 83
See application file for complete search history.

(56) References Cited

U.S. PATENT DOCUMENTS

| | | | | |
|---|---|---|---|---|
| 5,163,528 | A * | 11/1992 | Kawamoto et al. | 180/65.51 |
| 5,382,854 | A | 1/1995 | Kawamoto et al. | |
| 7,641,010 | B2 * | 1/2010 | Mizutani et al. | 180/65.51 |
| 2006/0144626 | A1 | 7/2006 | Mizutani et al. | |

FOREIGN PATENT DOCUMENTS

| | | |
|---|---|---|
| DE | 135 987 | 11/1902 |
| DE | 960 960 | 3/1957 |
| JP | 4 232182 | 8/1992 |
| JP | 2001 32888 | 2/2001 |
| JP | 2004 50886 | 2/2004 |
| JP | 2004 90822 | 3/2004 |
| JP | 2004 168211 | 6/2004 |
| JP | 2005 263140 | 9/2005 |

* cited by examiner

*Primary Examiner* — John Walters
(74) *Attorney, Agent, or Firm* — Oblon, Spivak, McClelland, Maier & Neustadt, L.L.P.

(57) ABSTRACT

A vehicle including a wheel assembly with an in-wheel motor that reduces the rate of output of the in-wheel motor using a reduction mechanism, which includes a counter gear mechanism and a planetary gear set, and drives a wheel and is structured such that the directionality of a helix angle of a helical gear of a counter gear mechanism in a left wheel is opposite the directionality of a helix angle of a helical gear of the counter gear mechanism in a right wheel, and the directionality of the helix angle of a helical gear of the planetary gear set in the left wheel is the same as the directionality of the helix angle of a helical gear of the planetary gear set in the right wheel.

13 Claims, 5 Drawing Sheets

VEHICLE HAVING A WHEEL ASSEMBLY WITH AN IN-WHEEL MOTOR

BACKGROUND OF THE INVENTION

1. Field of the Invention

The invention relates to a vehicle having a wheel assembly with an in-wheel motor that reduces the rate of output of the in-wheel motor using a reduction mechanism, which includes a counter gear mechanism and a planetary gear set, and drives a wheel.

2. Description of the Related Art

Japanese Patent Application Publication No. JP-A-2004-168211, for example, describes a related wheel assembly that reduces the rate of output of an in-wheel motor using a reduction mechanism, which includes a counter gear mechanism and a planetary gear set, and drives a wheel, as well as a vehicle having this wheel assembly.

In this kind of a vehicle having a wheel assembly with an in-wheel motor, the gears of the counter gear mechanism and the planetary gear set normally have a helix angle to prevent noise (i.e., helical gears are normally used instead of spur gears). In this case, the directionality of the helix angle of the helical gears of the counter gear mechanism and the planetary gear set is opposite in the left and right wheels so the gears used in the left wheel are different from the gears used in the right wheel (i.e., the gears used in the left and right wheels are not identical).

On the other hand, unlike the reduction mechanism of the transmission which is used by (i.e., common to) both the left and right wheels in a normal vehicle, there is a need to make parts in the reduction mechanisms of the in-wheel motors in a vehicle having wheel assemblies with in-wheel motors identical because the motors that are used in the left and right driving wheels are independent from each other. In particular, as in the vehicle having a wheel assembly with an in-wheel motor described above, there is an especially large number of gear parts when a two or more step reduction mechanism is used, which further increases the need for identical parts in the left and right wheels (i.e., parts in the left wheel that are the same as parts in the right wheel).

One way to do this is simply to make the helical gears in the counter gear mechanisms and the planetary gear sets in the left and right wheels identical by making the directionality of the helix angle of the helical gears of the counter gear mechanisms and the planetary gear sets the same.

However, this angle of torsion of helical gears generates axial force (i.e., thrust force). As a result, the bearings must have specifications that can satisfy loads in different directions in the left and right wheels, which is not easy to achieve. In particular, if the directionality of the helix angle of the helical gears of the counter gear mechanism that is responsible for a first reduction is the same for the left and right wheels, it is difficult to structure both bearings that support the rotor of the motor from the vehicle inside and outside satisfy the requirements relating to both bearing life and maximum allowable rotation speed. This is because on one hand it is necessary to increase the bearing diameter in order to extend the bearing life, while on the other hand it is necessary to reduce the bearing diameter in order to increase the maximum allowable rotation speed. Obviously, these two necessities are in contradiction with one another. For example, in order to ensure the bearing life, if the axial force generated by the helix angle of the helical gears on the left wheel side is in the direction toward the vehicle inside, it is necessary to increase the diameter of the bearing on the side that receives that axial force (e.g., the bearing on the vehicle inside). On the other hand, on the right wheel side in this case, the axial force generated by the helix angle of the helical gears is in the direction toward the vehicle outside so it is necessary to increase the diameter of the bearing on the side that receives that axial force (e.g., the bearing on the vehicle outside). In this way, if the necessary bearing life is to be ensured, the diameter of both bearings that support the rotor of the motor must ultimately be increased which reduces the maximum allowable rotation speed. That is, it is no longer possible to obtain a well-designed bearing that is suitable for the motor side.

SUMMARY OF THE INVENTION

This invention thus aims to efficiently provide gear parts related to a reduction mechanism which are identical in left and right wheels while enabling a well-designed bearing that is suitable for the motor side to be easily obtained in a vehicle having a wheel assembly with an in-wheel motor that reduces the rate of output of the in-wheel motor using a reduction mechanism, which includes a counter gear mechanism and a planetary gear set, and drives a wheel in order to simply the manufacturing process and thereby reduce costs.

A first aspect of the invention relates to a vehicle having a wheel assembly with an in-wheel motor, which includes a motor provided in each of a left wheel and a right wheel, and a reduction mechanism which includes a counter gear mechanism and a planetary gear set and is provided in each of the left wheel and the right wheel. In this vehicle having a wheel assembly with an in-wheel motor, the directionality of a helix angle of a helical gear of the counter gear mechanism in the left wheel is opposite the directionality of a helix angle of a helical gear of the counter gear mechanism in the right wheel, and the directionality of the helix angle of a helical gear of the planetary gear set in the left wheel is the same as the directionality of the helix angle of a helical gear of the planetary gear set in the right wheel.

In the vehicle having a wheel assembly with an in-wheel motor according to the first aspect, a bearing that rotatably supports a rotating shaft of the motor in the left wheel may be symmetrical with respect to a bearing that rotatably supports a rotating shaft of the motor in the right wheel, and a bearing that rotatably supports a rotating shaft of a sun gear of the planetary gear set in the left wheel may be the same as a bearing that rotatably supports a rotating shaft of a sun gear of the planetary gear set in the right wheel.

The invention makes it is possible to efficiently provide gear parts related to a reduction mechanism which are identical in left and right wheels while enabling a well-designed bearing that is suitable for the motor side to be easily obtained in a vehicle having a wheel assembly with an in-wheel motor that reduces the rate of output of the in-wheel motor using a reduction mechanism, which includes a counter gear mechanism and a planetary gear set, and drives a wheel.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

In the following description and the accompanying drawings, the present invention will be described in more detail in terms of example embodiments.

Figure 1:
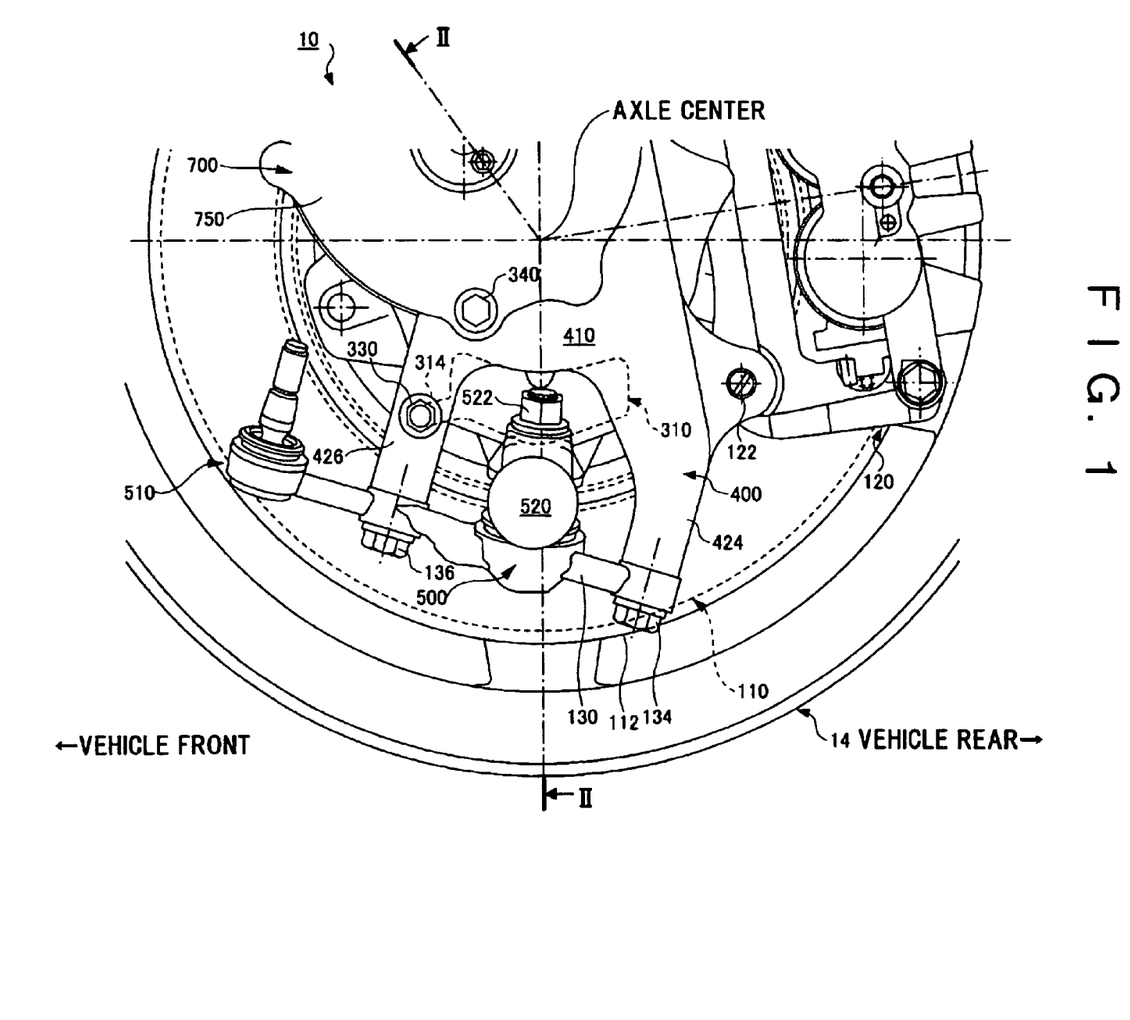
FIG. 1 is a view of a wheel assembly with an in-wheel motor as viewed from the vehicle inside.
Figure 2:
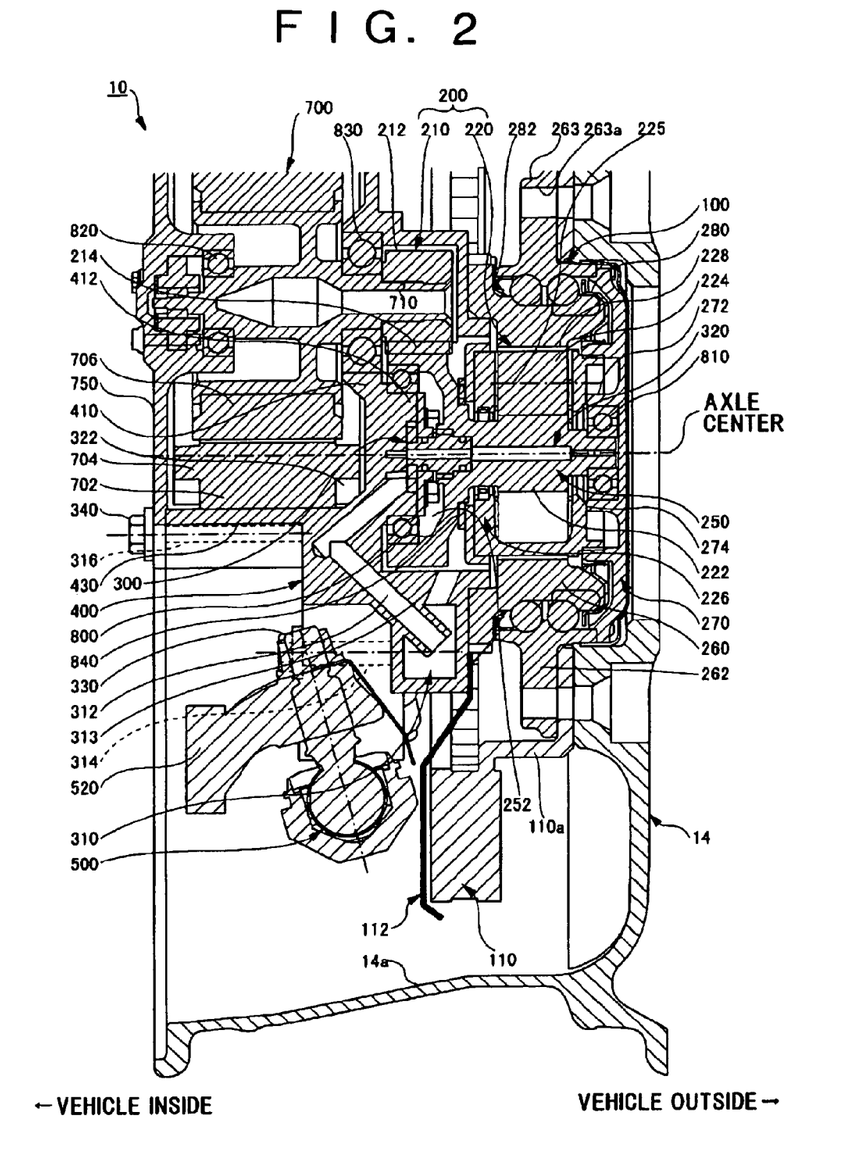
FIG. 2 is a sectional view of the wheel assembly with an in-wheel motor taken along line II-II in FIG. 1.
Figure 3:
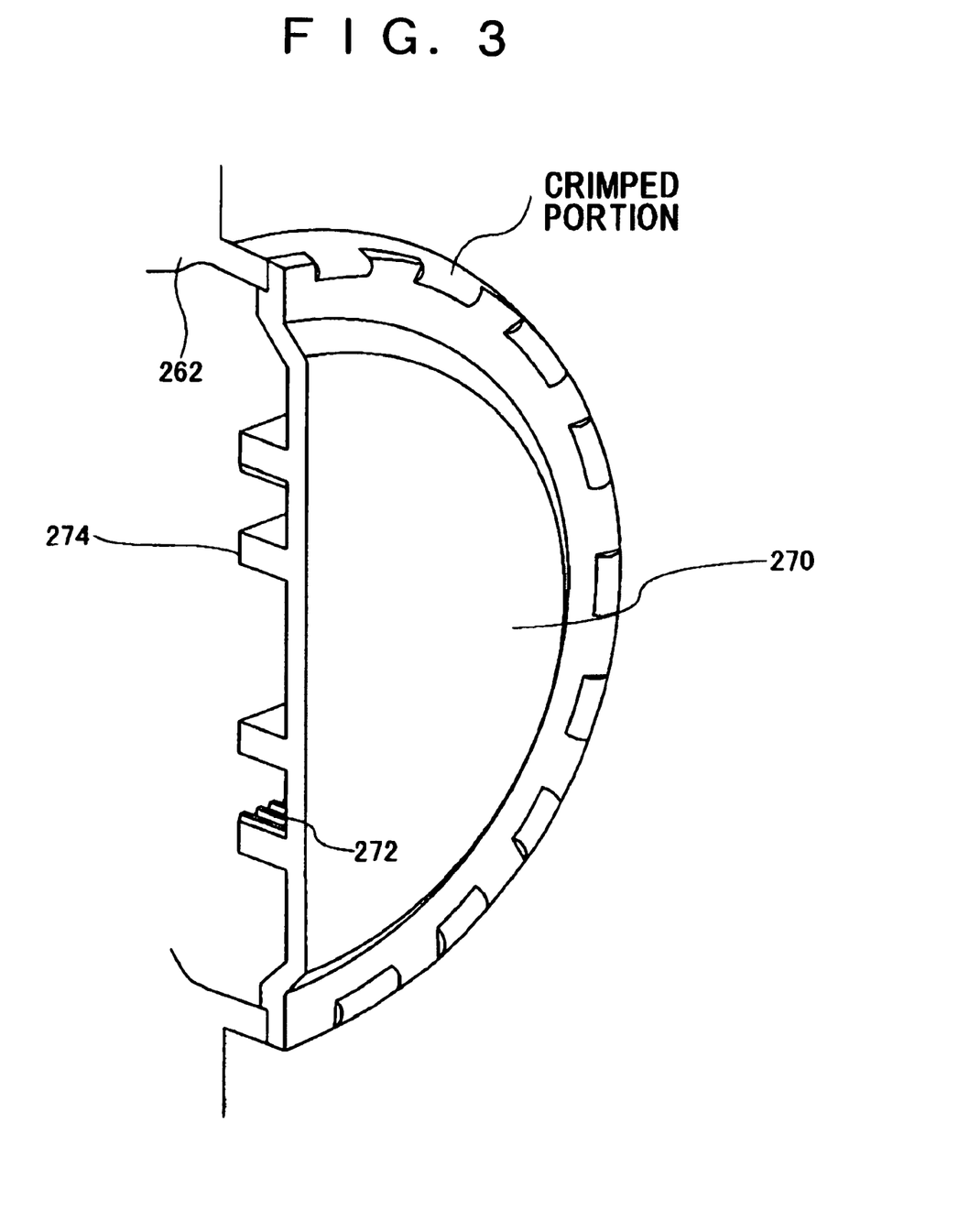
FIG. 3 is a perspective view of an example of a method for connecting an outer race side member to a power transmitting member.

FIGS. 1 and 2 are views of a wheel assembly with an in-wheel motor (the term "in-wheel motor" in this specification refers to a motor that is housed within a wheel) according to one example embodiment of the invention. FIG. 1 is a view of the wheel assembly from the vehicle inside and FIG. 2 is a sectional view taken along line II-II in FIG. 1. FIG. 3 is a perspective view of an example of a method for connecting an outer race side member 262 to a power transmitting member 270. In FIG. 1, the left side of the drawing corresponds to the front side of the vehicle. In FIGS. 1 and 2, the tire, as well as the upper ⅓ or so of the wheel, is omitted. In the descriptions of FIGS. 1 and 2, no particular distinction will be made as to whether a tire/wheel assembly 10 is the right wheel or the left wheel. That is, unless otherwise specified, the structures of the left and right wheels may be symmetrical.

The tire/wheel assembly 10 includes a wheel 14 to which a tire, not shown, is mounted. As will be described in detail later, the main portions of the constituent elements related to the motor are housed in a space enclosed by a rim inner peripheral surface 14a of the wheel 14. In the following description, the words "inside of the tire/wheel assembly" refer to the generally columnar space that is enclosed by the rim inner peripheral surface 14a of the wheel 14. However, expressions such as "a part is arranged inside the tire/wheel assembly" do not always mean that the entire part is housed completely within this generally columnar space. They also include structures in which a portion of the part partially protrudes from within that generally columnar space.

Arranged within the tire/wheel assembly 10 are mainly an axle bearing 100, a brake disc 110, a brake dust cover 112 that covers the brake disc 110 from the inner side of the vehicle in the vehicle width direction (hereinafter also referred to simply as "vehicle inside"), a brake caliper 120, a motor 700 for driving the wheel, a reduction mechanism 200, an oil pump 300, an oil tank 310, an oil flow path 320 (only part of which is shown), a knuckle (i.e., a carrier) 400, a lower ball joint 500 that is connected to a wheel-side end portion of a lower arm 520, and a ball joint 510 that is connected to a wheel-side end portion of a tie rod, not shown, (hereinafter referred to as "tie rod B/J 510"). Also, although not shown, an upper ball joint that is connected to the wheel-side end portion of an upper arm is also arranged in the tire/wheel assembly 10. However, when strut type suspension is used, the lower end of the strut (i.e., shock absorber), instead of the upper arm, is connected to the upper side of the knuckle 400.

The motor 700 is arranged in a space on the vehicle inside within the tire/wheel assembly 10. The motor 700 is arranged offset upward, in the height direction of the vehicle, as shown in FIG. 2, and forward, in the longitudinal direction of the vehicle, as shown in FIG. 1, with respect to the axle center.

Accordingly, a space not occupied by the motor 700, which corresponds to the amount that the motor 700 is offset, is created to the lower rear on the vehicle inside within the tire/wheel assembly 10, as shown in FIG. 1. Therefore, the lower space on the vehicle inside within the tire/wheel assembly 10 is larger than it is with a structure in which the motor is arranged on the same axis as the axle center. As a result, there is a larger degree of freedom for arranging the suspension on the lower side. Also, the brake caliper 120 can easily be housed on the side (i.e., the vehicle rear side in this example) opposite the side (i.e., the vehicle front side) to which the motor 700 is offset within the tire/wheel assembly 10, as shown in FIG. 1.

The motor 700 includes a stator core 702, a stator coil 704, and a rotor 706. If the motor 700 is a three phase motor, the stator coil 704 may include a U phase coil, a V phase coil, and a W phase coil. The rotor 706 is arranged on the inner peripheral sides of the stator core 702 and the stator coil 704.

The rotor 706 of the motor 700 has an output shaft 710, the rotational center of which is offset with respect to the axle center, as described above.

The output shaft 710 is connected to the inner race side of the bearing 820 on the vehicle inside within the tire/wheel assembly 10. The outer race side of the bearing 820 is connected to a motor cover 750. Accordingly, the output shaft 710 is rotatably supported by the motor cover 750 via the bearing 820 on the vehicle inside. Similarly, the output shaft 710 is connected to the inner race side of the bearing 830 on the outer side of the vehicle in the vehicle width direction (hereinafter also referred to simply as "vehicle outside") within the tire/wheel assembly 10. The outer race side of the bearing 830 is connected to the knuckle 400. Accordingly, the output shaft 710 is rotatably supported by the knuckle 400 via the bearing 830 on the vehicle outside. The bearings 820 and 830 may be radial ball bearings which use balls as rolling bodies, such as single-row, deep-grooved ball bearings, for example.

The bearing 820 may serve as a second bearing on the motor side and the bearing 830 may serve as a first bearing on the motor side.

The rotational output of the motor 700 is transmitted to the wheel 14 via the reduction mechanism 200. The reduction mechanism 200 is a twin shaft reduction mechanism which includes a counter gear mechanism 210 and a planetary gear set 220. Thus the reduction mechanism 200 realizes a two step reduction.

As shown in FIG. 2, the counter gear mechanism 210 is arranged farther to the vehicle outside than the motor 700. The counter gear mechanism 210 includes a small diameter driving gear 212 which is arranged on the output shaft 710 of the motor 700, and a large diameter driven gear (i.e., a counter gear) 214 that is in mesh with the driving gear 212. The small diameter driving gear 212 is spline fitted to the output shaft 710 of the motor 700 from the vehicle outside, and thus integrated with the output shaft 710. At this time, the vehicle inside end surface of the driving gear 212 abuts against the inner race side of the bearing 830 that is connected to the output shaft 710 of the motor 700. The large diameter counter gear 214 is formed with the axle center as its rotational center. Thus, the output shaft 710 of the motor 700 is arranged offset with respect to the axle center by approximately the distance of the combined radii of the driving gear 212 and the counter gear 214.

As shown in FIG. 2, the planetary gear set 220 is arranged farther to the vehicle outside than the counter gear mechanism 210 within the tire/wheel assembly 10. The planetary gear set 220 is arranged on the same axis as the axle center, and includes a sun gear 222, a planetary gear 224, a planetary carrier 226, and a ring gear 228.

The sun gear 222 is connected to the counter gear 214 of the counter gear mechanism 210. In the example shown in FIG. 2, the sun gear 222 is formed on one end side of a shaft (i.e., sun gear shaft) 250 and the counter gear 214 is formed on the other end side of the shaft 250 in the width direction of the vehicle. That is, the shaft 250 has a rotational center that is on the same axis as the axle center. The sun gear 222 is positioned on the peripheral surface of the end portion on the vehicle outside, and the counter gear 214 is positioned on the peripheral surface of the end portion on the vehicle inside. The sun gear 222 and the counter gear 214 may also be formed as separate parts, in which case they may be connected using splines.

The end portion of the shaft 250 on the vehicle inside is connected to the outer race side of the bearing 800. As shown in FIG. 2, the bearing 800 may be incorporated inside (i.e., on the inner peripheral side of) the counter gear 214, and a convex portion 412 of the knuckle 400 connected by press-fitting or the like to the inner race side of the bearing 800. Accordingly, the shaft 250 is rotatably supported on the vehicle inside by the knuckle 400 via the bearing 800. Similarly, the vehicle outside end portion of the shaft 250 is connected to the inner race side of a bearing 810. The bearing 810 is connected by press-fitting or the like to the inner peripheral side of a peripheral wall of a disc-shaped power transmitting member 270. Accordingly, the shaft 250 is rotatably supported on the vehicle outside by the power transmitting member 270 via the bearing 810. Also, the bearings 800 and 810 may be radial ball bearings which use balls as rolling bodies, such as single-row, deep-grooved ball bearings, for example.

The bearing 800 may serve as a first bearing on the planetary gear set side and the bearing 810 may serve as a second bearing on the planetary gear set side.

The planetary gear 224 is in mesh with the sun gear 222 on the inner peripheral side and in mesh with the ring gear 228 on the outer peripheral side. The planetary gear 224 is rotatably supported around a roller shaft 225 via a roller bearing by the planetary carrier 226. The rotational center of the planetary carrier 226 is the same as the axle center. The planetary carrier 226 is supported at the vehicle inside within the tire/wheel assembly 10 by the shaft 250 via a thrust cylindrical roller bearing 840, and is spline fitted at the vehicle outside to a circumferential groove 272 (see FIG. 3) formed circumferentially in the power transmitting member 270. A plurality of the planetary gears 224 are arranged at equidistant intervals around the sun gear 222. The planetary gears 224 and the planetary carrier 226 are assembled to form a single unit (hereinafter referred to as "planetary gear unit"). The planetary carrier 226 of this planetary gear unit abuts against a stopper portion 274 of the power transmitting member 270 on the vehicle outside. Accordingly, displacement of the planetary gear unit in the width direction of the vehicle is restricted by the thrust cylindrical roller bearing 840 and the stopper portion 274.

The rotational center of the ring gear 228 is the same as the axle center. The ring gear 228 is formed on the inner peripheral surface of an inner race side member 260 that is arranged so as to surround the sun gear 222 from the outer peripheral side. The outer peripheral surface of the inner race side member 260 forms an inner race of the axle bearing 100. In the illustrated example, the axle bearing 100 is a double-row angular ball bearing. The outer inner race with respect to the row on the vehicle outside is formed of a separate member than the inner race side member 260. This kind of separate member is integrated with the inner race side member 260 by fitting it around the outer periphery of the inner race side member 260.

An outer race side member 262 is arranged so as to surround the inner race side member 260 from the outer peripheral side. The inner peripheral surface of the outer race side member 262 forms an outer race of the axle bearing 100. Seals 280 and 282 for preventing foreign matter from getting in and oil from flowing out are provided at the end portions in the width direction of the vehicle between the outer race side member 262 and the inner race side member 260.

The power transmitting member 270 is a disc-shaped member provided so as to cover the vehicle outside of the reduction mechanism. The circumferential groove 272 to which the vehicle outside end portion (peripheral wall portion) of the planetary carrier 226 is spline fitted is formed on the vehicle inside of the power transmitting member 270. The outer peripheral edge of the power transmitting member 270 is connected to the end portion on the vehicle outside of the outer race side member 262 by crimping or the like, as shown in FIG. 3. That is, the power transmitting member 270 is fixed to the outer race side member 262 so that it blocks a generally circular opening on the vehicle outside of the outer race side member 262. The outer race side member 262 has a flange portion 263 that protrudes toward the outside in the radial direction on the outer peripheral surface. A bolt hole 263a for fastening a hub bolt, not shown, is formed in this flange portion 263. The outer race side member 262 is fastened together with the brake disc 110 by the hub bolt to the wheel 14 with the inner peripheral portion of the brake disc 110 being sandwiched between the flange portion 263 and the wheel 14.

In the foregoing structure, when the rotor 706 of the motor 700 rotates in response to a command from a vehicle control apparatus, not shown, the small diameter driving gear 212 rotates, and as it does so, the large diameter counter gear 214 that is in mesh with the driving gear 212 rotates, thus realizing a first reduction by the counter gear mechanism 210. When the counter gear 214 rotates, the sun gear 222 which is integral with the counter gear 214 also rotates. As a result, the planetary gears 224 rotate while revolving around the sun gear 222. This rotation realizes a second reduction by the planetary gear set 220. The revolving motion of the planetary gears 224 is output by the planetary carrier 226 and transmitted to the power transmitting member 270 which is spline fitted to the planetary carrier 226. The tire/wheel assembly 10 is driven as the outer race side member 262, the brake disc 110, and the wheel 14 all rotate together with the power transmitting member 270.

The knuckle 400 mainly includes a main structure portion 410 positioned near substantially the center of the tire/wheel assembly 10, and a cylindrical peripheral wall portion (i.e., a motor case portion) 430. The main constituent elements of the motor 700 described above are arranged in a space to the inside in the radial direction of the peripheral wall portion 430 of the knuckle 400. The motor cover 750 is connected to the end portion on the vehicle inside of the peripheral wall portion 430 of the knuckle 400 so as to cover the space inside the peripheral wall portion 430.

Unlike the thin peripheral wall portion 430 and other ribs and the like, the main structure portion 410 of the knuckle 400 has sufficient strength and rigidity, and therefore serves to receive loads input via the axle bearing 100, the mounting points of the tie rod and the suspension arm (i.e., lower arm 520, etc.), and the brake caliper mounting point 122.

The inner race side member 260 is connected by press-fitting or a bolt, for example, to the end portion on the vehicle outside of the main structure portion 410 of the knuckle 400. The main structure portion 410 of the knuckle 400 receives various loads input from the tire/wheel assembly 10 via the axle bearing 100 (i.e., the inner race side member 260) at the vehicle outside end portion. The counter gear mechanism 210 described above is arranged in the space inside the main structure portion 410 of the knuckle 400. The main structure portion 410 of the knuckle 400 receives various thrust loads and radial loads input via the bearing 830 and the bearing 800.

The main structure portion 410 of the knuckle 400 has two leg portions 424 and 426 that extend from the lower side. A knuckle arm 130 is fastened by a bolt or the like to the lower end of the each leg portion 424 and 426. The knuckle arm 130 extends in the longitudinal direction of the vehicle within the tire/wheel assembly 10. The tie rod B/J 510 is installed on the front end side of the knuckle arm 130 and the lower ball joint 500 is installed on the rear end side of the knuckle arm 130. The main structure portion 410 of the knuckle 400 receives various loads input via the lower ball joint 500 and the tie rod B/J 510.

Lower ball joint 500 is arranged between the two leg portions 424 and 426 in the longitudinal direction of the vehicle and generally in the center of the tire/wheel assembly 10 in the longitudinal direction of the vehicle, as shown in FIG. 1. Also, as shown in FIG. 2, the lower ball joint 500 is arranged farther toward the vehicle inside than the brake disc 110. The lower arm 520 is fastened to the lower ball joint 500 by a nut 522 from above. The lower arm 520 extends in the width direction of the vehicle and the vehicle inside end portion is supported by a vehicle body, not shown, via a bush and the like. The lower arm 520 may be any type. For example, it may be an L-shaped lower arm or a double ring type lower arm. The lower arm 520 works in cooperation with the upper arm (or strut), not shown, to pivotally support the tire/wheel assembly 10 with respect to the vehicle body. Also, a spring and an absorber, not shown, are provided between the vehicle body and the lower arm 520. As a result, input from the tire/wheel assembly 10 to the vehicle body is reduced. The spring may be any type of spring coil or air spring. Also, the absorber may not only be a hydraulic absorber that applies damping action to vertical input, but also a rotary electromagnetic absorber that applies damping action to rotational input.

In this example embodiment, the motor 700 is offset upward with respect to the axle center, as described above. This increases the degree of freedom in the arrangement/position of the lower ball joint 500 (i.e. in the arrangement of the kingpin axis). For example, the lower ball joint 500 can also be moved as close to the brake disc 110 as possible, leaving only the necessary clearance, as shown in FIG. 2. As a result, the amount of offset of each member and the tire input point in the width direction of the vehicle is reduced, thereby enabling the necessary strength and rigidity of the members (such as the main structure portion 410 of the knuckle) to be reduced, which reduces weight.

As shown in FIG. 1, the tie rod B/J 510 is arranged farther to the front than the front leg portion 426 in the longitudinal direction of the vehicle. The tie rod B/J 510 is also arranged farther to the vehicle inside than the brake disc 110. A tie rod, not shown, is fastened to the tie rod B/J 510 by a nut, not shown, from above. The tie rod extends in the width direction of the vehicle and the vehicle inside end portion is connected to a rack shaft, not shown, which is connected to a steering shaft by a rack and pinion mechanism, for example, thus enabling the tire/wheel assembly 10 to be steered. In this way, according to this example embodiment, the motor 700 is offset above the axle center, as described above, which makes it easy to fit the tie rod B/J 510 inside the tire/wheel assembly 10.

As shown in FIG. 1, mounting points 122 (only one point is shown in the drawing) for the brake caliper 120 arranged on the vehicle rear side with respect to the motor 700 are installed on the main structure portion 410 of the knuckle 400. The main structure portion 410 of the knuckle 400 receives the loads input during braking via the mounting points 122 for the brake caliper 120. In the example shown in the drawing, the lower mounting point 122 of the brake caliper 120 is set near the base of the leg portion 424 to the vehicle rear of the knuckle 400. Making this kind of extremely strong and rigid portion a mounting portion for the brake caliper 120 enables a reasonable structure to be achieved.

The oil pump 300 is arranged between the motor 700 and the planetary gear set 220 of the reduction mechanism 200 in the width direction of the vehicle. More specifically, the oil pump 300 is provided on the vehicle inside end portion of the shaft 250. In the example shown in FIG. 2, the oil pump 300 is arranged inside the counter gear 214 of the counter gear mechanism 210, i.e., to the inside of the counter gear 214 in the radial direction. In other words, the convex portion 412 that forms part of the main structure portion 410 of the knuckle 400 is accommodated within a cavity 252 formed in the vehicle inside end portion (i.e., a portion with a larger diameter) of the shaft 250. A concave portion is formed to the inside of the convex portion 412 in the radial direction. The oil pump 300 is provided in this concave portion. The oil pump 300 may not only be a trochoid pump as shown in the drawings, but any one of a variety of gear pumps such as an external gear pump or an internal gear pump (with or without a crescent-shaped partition), or another type of hydraulic pump such as a vane pump, for example.

The oil pump 300 is driven by rotational output of the motor 700. More specifically, the inner rotor of the oil pump 300 is connected to the vehicle inside end portion of the shaft 250, and thus rotates when the shaft 250 rotates. That is, the inner rotor of the oil pump 300 is driven by the same shaft that the counter gear 214 is provided on. When the inner rotor rotates, oil in the oil tank (i.e., oil reservoir) 310 is drawn up via a suction path 312. The oil that is drawn in through an inlet, not shown, is then caught between the inner and outer rotors of the oil pump 300 and discharged from an outlet, not shown, to the oil flow path 320.

In this example embodiment, as described above, the oil pump 300 is driven by rotational output of the counter gear 214. Therefore, the oil pump 300 is driven at a speed that is slower than the speed of the motor 700 by the amount corresponding to the speed reduction from the counter gear mechanism 210. As a result, the fastest rotation speed of the oil pump 300 is less than it is when the oil pump 300 is driven by the output shaft 710 of the motor 700, which improves the durability of the oil pump 300.

Also, in this example embodiment, as described above, the oil pump 300 is set inside the shaft 250 (i.e., inside the counter gear 214) and arranged in substantially the same area as the counter gear mechanism 210 in the width direction of the vehicle. Therefore, the length in the axial direction necessary to arrange the motor 700, the oil pump 300, and the reduction mechanism 200 can be shortened by the amount of the oil pump 300 compared to when the motor, oil pump, and reduction mechanism are arranged in series.

Also, as described above, in this example embodiment, the oil pump 300 is arranged between the motor 700 and the planetary gear set 220 of the reduction mechanism 200. Therefore, it is easy to the arrange oil flow path 320 for cooling the motor 700 or lubricating the reduction mechanism 200 and the various bearings (such as the bearings 800, 810, 820, and 830). While the path of the oil flow path 320 will not be described in detail here, the oil in the oil flow path 320 formed inside the shaft 250 is supplied to the bearing 810, and supplied to the planetary gears 224 via oil holes, not shown, by centrifugal force generated as the shaft 250 rotates, for example. The oil supplied in this way is used to lubricate the bearing 810 as well as the roller bearings which are at the rotational centers of the planetary gears 224. Further, the oil from the oil pump 300 is used to cool the stator coil 704 and lubricate the bearings 800, 820, and 830 via the oil flow path 320 (which is not shown in the cross section in FIG. 2) formed using the space 322 near the coil end of the stator coil 704. The oil used for cooling or lubrication as described above is then finally returned to the oil tank 310 by gravity.

The oil tank 310 is formed below the knuckle 400 and is arranged below, along a vertical line that is orthogonal to, the axle center in the tire/wheel assembly 10, as shown in FIG. 2. Also, the oil tank 310 is arranged farther to the vehicle outside than the lower ball joint 500 and farther to the vehicle inside than the brake dust cover 112, as shown in FIG. 2. The oil tank 310 is arranged using the space inside a hat portion 110a of the brake disc 110. A lower end portion of the suction path 312 formed in the knuckle 400, as well as an oil return path 313 for returning oil, is communicated with the oil tank 310. The oil tank 310 serves to collect oil for cooling the motor 700 or lubricating the reduction mechanism 200, as described above.

A drain plug 330 is a removable plug that blocks the opening of a drain flow path 314 of the oil tank 310, and can be removed when draining used oil from inside the oil tank 310, such as when changing the oil, for example. The drain flow path 314 is formed so that it is connected to the oil tank 310 inside the knuckle 400. Also, the drain flow path 314 has an opening on the vehicle inside surface of the knuckle 400. The drain plug 330 which is liquid-tight is attached to the opening. The drain plug 330 is arranged offset toward the front of the vehicle with respect to the lower ball joint 500, as shown in FIG. 1.

A filler plug 340 is a removable plug that blocks the opening of a filler flow path 316 (only a portion of which is shown) of the oil tank 310, and can be removed when filling the oil tank 310 with new oil, such as when changing the oil, for example. The filler flow path 316 is formed so that it is communicated with the oil tank 310 inside the knuckle 400. In this example, the filler flow path 316 is formed in the vehicle width direction in a peripheral wall portion 430 of the knuckle 400, as shown in FIGS. 1 and 2. The filler flow path 316 has an opening on the vehicle inside surface of the inner peripheral portion 430, and the filler plug 340, which is liquid-tight, is attached to the opening. The filler plug 340 is arranged farther to the vehicle inside than the lower ball joint 500, as shown in FIG. 2.

Next, based on the foregoing structure, the details of the reduction mechanism 200 and the bearings 800, 810, 820, and 830 described above will be described as the characteristic structure of this example embodiment. In the following description, the left-right symmetry of the structures of the left and right wheels will be discussed so for the sake of convenience, when necessary the letter L will be appended to the reference numeral for those structures on the left wheel side and the letter R will be appended to the reference numerals for those structures on the right wheel side. The rotational direction of the rotor 706L when the motor 700L is driven is symmetrical with respect to the rotation direction of the rotor 706R when the motor 700R is driven.

Gears 212L, 212R, 214L, 214R, 222L, 222R, 224L, 224R, 226L, 226R, 228L, and 228R of the reduction mechanisms 200L and 200R are all helical gears in which the tooth traces are helical in order to prevent noise from being generated at the portions where the teeth come into contact with one another.

Figure 4:
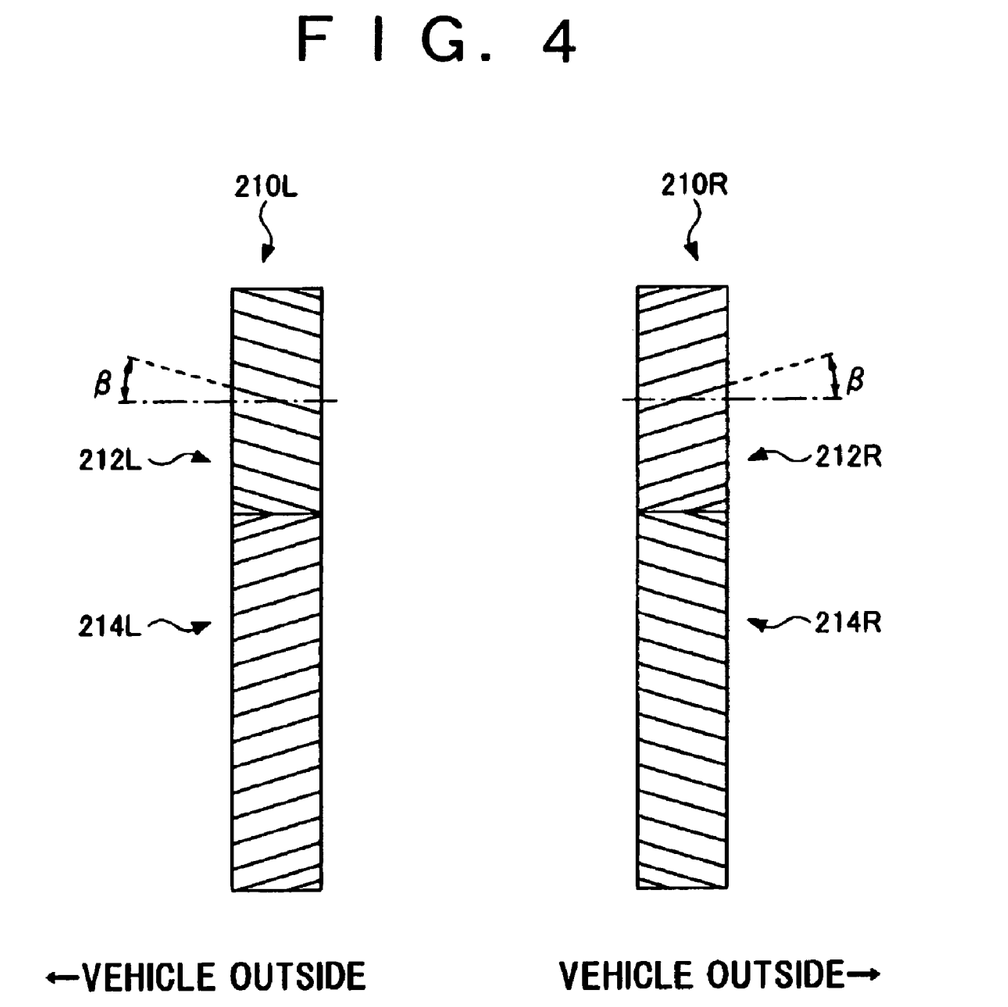
FIG. 4 is a view schematically showing a tooth trace of gears in a counter gear mechanism for a left wheel and a tooth trace of gears in a counter gear mechanism for a right wheel.

FIG. 4 is a view schematically showing the directions of the angles of torsion of the driving gear 212L and the counter gear 214L of the counter gear mechanism 210L for the left wheel, and the driving gear 212R and the counter gear 214R of the counter gear mechanism 210R for the right wheel.

In this example embodiment, the angles of torsion β are the same for the driving gear 212L and the counter gear 214L of the counter gear mechanism 210L for the left wheel as they are for the driving gear 212R and the counter gear 214R of the counter gear mechanism 210R for the right wheel, as shown in FIG. 4, but the directionality of the angles of torsion β (i.e., the directions of torsion) is opposite.

Figure 5:
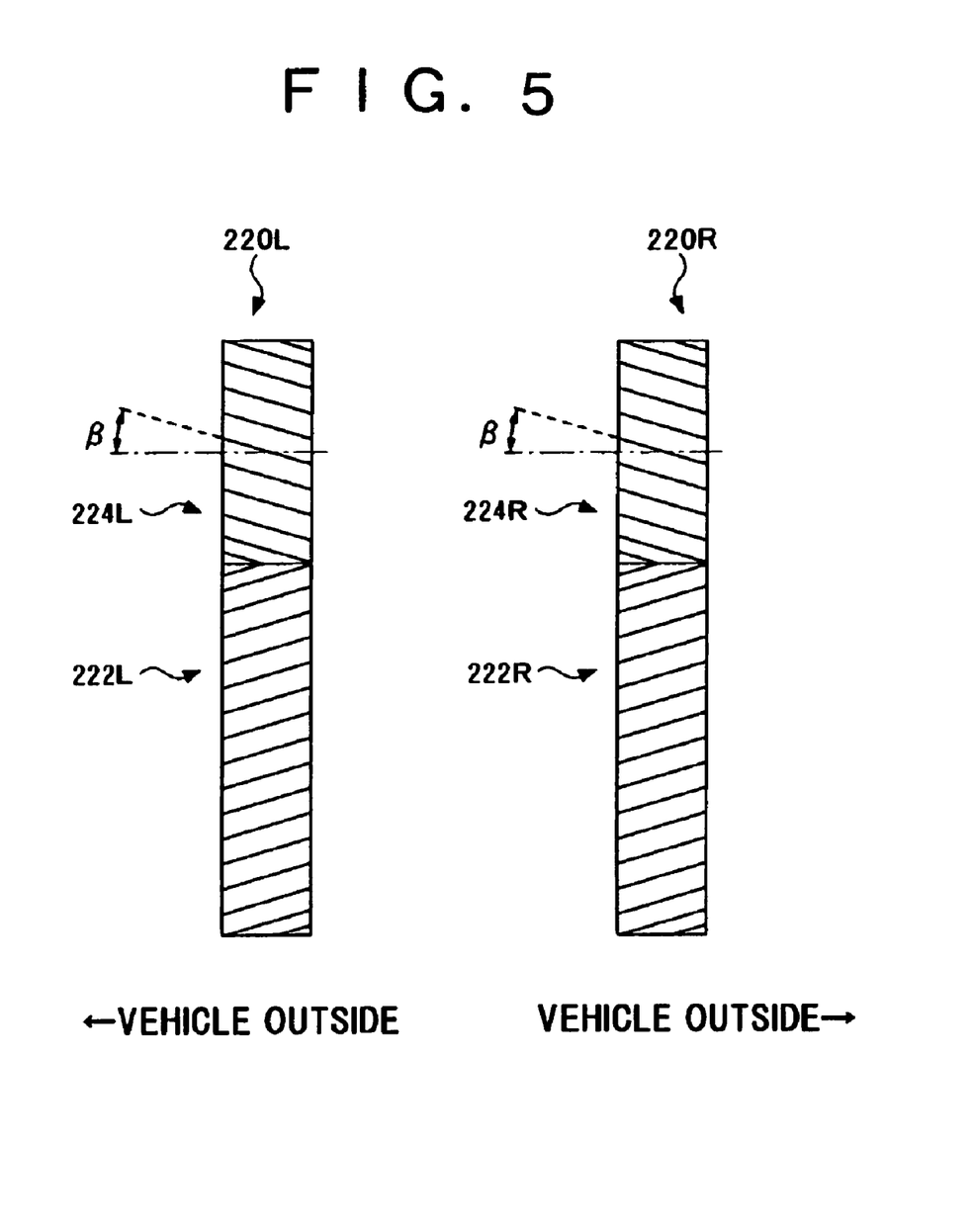
FIG. 5 is a view schematically showing tooth traces of gears in a planetary gear set for the left wheel and tooth traces of gears in a planetary gear set for the right wheel.

Meanwhile, FIG. 5 is a view schematically showing the directionality of the angles of torsion of the gears 222L and 224L from among the gears 222L, 224L, 226L, and 228L of the planetary gear set 220L for the left wheel, and the directionality of the angles of torsion of the gears 222R and 224R from among the gears 222R, 224R, 226R, and 228R of the planetary gear set 220R for the right wheel. In this example embodiment, the angles of torsion β as well as the directionality of the angles of torsion are the same for the gears of the planetary gear set 220L for the left wheel as they are for gears of the planetary gear set 220R for the right wheel.

Accordingly, the gears of the planetary gear set 220L for the left wheel and the gears of the planetary gear set 220R for the right wheel can be identical.

Here, because axial force (i.e., thrust force) is generated in helical gears due to the helix angle, the axial force is generated in different direction with respect to the left wheel than it is with respect to the right wheel when the gears of the planetary gear set 220L for the left wheel and the gears of the planetary gear set 220R for the right wheel are identical. As a result, the bearings 800L and 800R and 810L and 810R on both sides that support the shafts (i.e., the sun gear shafts) 250L and 250R originally have to have specifications that are different for the right side than they are for the left side. With this example embodiment, however, at the stage at which rotation of the motors 700L and 700R is input to the planetary gear sets 220L and 220R, the rate of that rotation is slowed by the counter gear mechanisms 210L and 210R, as described above, so a high maximum allowable rotation speed is not required of the bearings 800L, 800R, 810L, and 810R. Therefore, the specifications for the bearings 800L, 800R, 810L, and 810R only need to take the bearing life into account. Thus, by simply increasing the bearing diameters slightly with respect to the respective optimal bearing diameters (sizes), the bearings 800L, 800R, 810L, and 810R on the left and right sides can have the same specifications. That is, the specifications of all of the bearings 800L, 800R, 810L, and 810R can be made to match the specifications that are most required from among the respective optimal specifications. For example, with respect to the bearing 800L and the bearing 800R, when the optimal diameter of the bearing 800L is smaller than the optimal diameter of the bearing 800R, the diameter of the bearing 800L need only be made to match the optimal diameter of the bearing 800R. At this time, the adverse effects from making the diameter of the bearing 800L larger than necessary (i.e., larger than the optimal value), i.e., the decrease in the maximum allowable rotation speed, does not pose a problem because of the first reduction by the counter gear mechanisms 210L and 210R.

On the other hand, the specifications of the bearings 820 and 830 on both sides that support the output shaft 710 (i.e., the rotor 750) of the motor 700 must satisfy the high maximum allowable rotation speed that matches the maximum rotation speed of the motor 700. With respect to this, according to this example embodiment, as described above, the counter gear mechanism 210L for the left wheel and the counter gear mechanism 210R for the right wheel are symmetrical, as described above, so there is no difference in the direction of the axial force with respect to each wheel of the left and right wheels. Accordingly, in this example embodiment, the bearings 820L and 820R can have the same (i.e., symmetrical) optimum specifications, and the bearings 830L and 830R can have the same (i.e., symmetrical) optimum specifications. Therefore, the bearings 820L, 820R, 830L, and 830R can easily be made to have the optimum specifications that satisfy the conditions for a high maximum allowable rotation speed and the necessary bearing life. For example, the dynamic load rating or the dynamic equivalent load of the bearing 830L and 830R may be set higher than it is for the corresponding bearings 820L and 820R. As a result, a reasonable structure can be realized in which the main structure portion 410 of the knuckle 400, which is extremely strong and rigid, can be made to receive a large load.

In this way, according to this example embodiment, only the angles of torsion of the gears of the counter gear mechanisms 210L and 210R that are responsible for the first reduction are in opposite directions (resulting in left-right symmetry). The angles of torsion of the gears of the planetary gear sets 220L and 220R that are responsible for the second reduction are in the same direction. As a result, it is easy to obtain well-designed bearings 820L, 820R, 830L, and 830R that are suitable for the sides on which the motors 700L and 700R are provided, while efficiently reducing the total number of kinds of parts in attempt to optimize usage of gear parts that are identical in the left and right wheels. More specifically, the planetary gear sets 220L and 220R have more gears than the counter gear mechanisms 210L and 210R so the effect from making gears in the planetary gear sets 220L and 220R identical is more significant.

While example embodiments of the invention have been illustrated above, it is to be understood that the invention is not limited to details of the illustrated embodiments, but may be embodied with various changes, modifications or improvements without departing from the spirit and scope of the invention.

For example, in the example in the drawings, the reduction mechanism 200 realizes a two step reduction, but it may also realize a three or more step reduction. For example, the reduction mechanism 200 may realize a first step reduction using the counter gear mechanism and realize second and third step reductions using two planetary gear sets that are connected in series. In this case as well, it is possible to increase the number of bearings and gears in the two planetary gear sets that are connected in series, which are identical in the left and right wheels by making only the counter gear mechanism that realizes the first reduction symmetrical in the left and right wheels.

Moreover, in the illustrated example, the counter gear mechanism 210 is such that the counter gear 214 is circumscribed on the driving gear 212 that is directly connected to the motor 700, thereby reducing the diameter of the main structure portion 410 of the knuckle 400 that surrounds the counter gear mechanism 210. However, the driving gear 212 may instead be inscribed in a larger diameter counter gear. That is, the driving gear 212 and the counter gear may be structured such that teeth on the inner peripheral surface of the counter gear mesh with teeth on the outer peripheral surface of the driving gear 212.

Further, the illustrated example shows a wheel assembly with an in-wheel motor related to a steered wheel, but the invention can also be applied to a wheel other than a steered wheel.

Also, the directionality of the angles of torsion of the driving gear 212L and the counter gear 214L of the counter gear mechanism 210L for the left wheel, and directionality of the angles of torsion of the driving gear 212R and the counter gear 214R of the counter gear mechanism 210R for the right wheel may be reversed.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

The invention claimed is:

1. A vehicle having a wheel assembly with an in-wheel motor, comprising:
    a motor provided in each of a left wheel and a right wheel; and
    a reduction mechanism, which includes a counter gear mechanism and a planetary gear set, provided in each of the left wheel and the right wheel,
    wherein a directionality of a helix angle of a helical gear of the counter gear mechanism in the left wheel is opposite a directionality of a helix angle of a helical gear of the counter gear mechanism in the right wheel, and
    wherein a directionality of a helix angle of a helical gear of the planetary gear set in the left wheel is the same as a directionality of a helix angle of a corresponding helical gear of the planetary gear set in the right wheel.

2. The vehicle having a wheel assembly with an in-wheel motor according to claim 1, further comprising:
    a motor bearing that rotatably supports a rotating shaft of the motor in each of the left wheel and the right wheel; and
    a planetary gear set bearing that rotatably supports a rotating shaft of a sun gear of the planetary gear set in each of the left wheel and the right wheel,
    wherein the motor bearing in the left wheel and the motor bearing in the right wheel are symmetrical, and
    wherein the planetary gear set bearing in the left wheel is the same as the planetary gear set bearing in the right wheel.

3. The vehicle having a wheel assembly with an in-wheel motor according to claim 2, wherein each of the motor bearings and each of the planetary gear set bearings includes a first bearing,
    wherein the first bearings of the motor bearings have a higher dynamic load rating or dynamic equivalent load than the second bearings of the motor bearings; and
    wherein the first bearings of the planetary gear set bearings and the second bearings of the planetary gear set bearings have the same structure.

4. The vehicle having a wheel assembly with an in-wheel motor according to claim 3, further comprising:

a main structure portion of a knuckle which is provided in each of the left wheel and the right wheel and defines a transfer path of a load applied to the left wheel and the right wheel, respectively, wherein each of the first bearings of the motor bearings is positioned farther toward a vehicle outside than each of the second bearings of the motor bearings, in each of the left wheel and the right wheel, respectively, wherein each of the first bearings of the planetary gear set bearings is positioned farther toward a vehicle inside than the second bearings of the planetary gear set bearings, in each of the left wheel and the right wheel, respectively, and wherein each of the first bearings of the motor bearings and each of the first bearings of the planetary gear set bearings are arranged inside the main structure portion of the knuckle in each of the left wheel and the right wheel, respectively.

5. The vehicle having a wheel assembly with an in-wheel motor according to claim 3, further comprising:

an oil pump which is provided in each of the left wheel and the right wheel and is driven by rotational output of the counter gear mechanism, wherein the oil pump is arranged between the motor and the planetary gear set in a vehicle width direction in each wheel.

6. The vehicle having a wheel assembly with an in-wheel motor according to claim 5, wherein each oil pump is arranged on an inner radial side of a counter gear of each counter gear mechanism.

7. The vehicle having a wheel assembly with an in-wheel motor according, to claim 3, wherein an output shaft of each motor is arranged offset upward and forward with respect to an axle center of each of the left wheel and the right wheel, respectively.

8. The vehicle having a wheel assembly with an in-wheel motor according to claim 2, further comprising:

an oil pump which is provided in each of the left wheel and the right wheel and is driven by rotational output of the counter gear mechanism, wherein the oil pump is arranged between the motor and the planetary gear set in a vehicle width direction in each wheel.

9. The vehicle having a wheel assembly with an in-wheel motor according to claim 8, wherein each oil pump is arranged on an inner radial side of a counter gear of each counter gear mechanism.

10. The vehicle having a wheel assembly with an in-wheel motor according to claim 2, wherein an output shaft of each motor is arranged offset upward and forward with respect to an axle center of each of the left wheel and the right wheel, respectively.

11. The vehicle having a wheel assembly with an in-wheel motor according to claim 1, further comprising:

an oil pump which is provided in each of the left wheel and the right wheel and is driven by rotational output of the counter gear mechanism, wherein the oil pump is arranged between the motor and the planetary gear set in a vehicle width direction in each wheel.

12. The vehicle having a wheel assembly with an in-wheel motor according to claim 11, wherein each oil pump is arranged on an inner radial side of a counter gear of each counter gear mechanism.

13. The vehicle having a wheel assembly with an in-wheel motor according to claim 1, wherein an output shaft of each motor is arranged offset upward and forward with respect to an axle center of each of the left wheel and the right wheel, respectively.

* * * * *